UNITED STATES PATENT OFFICE.

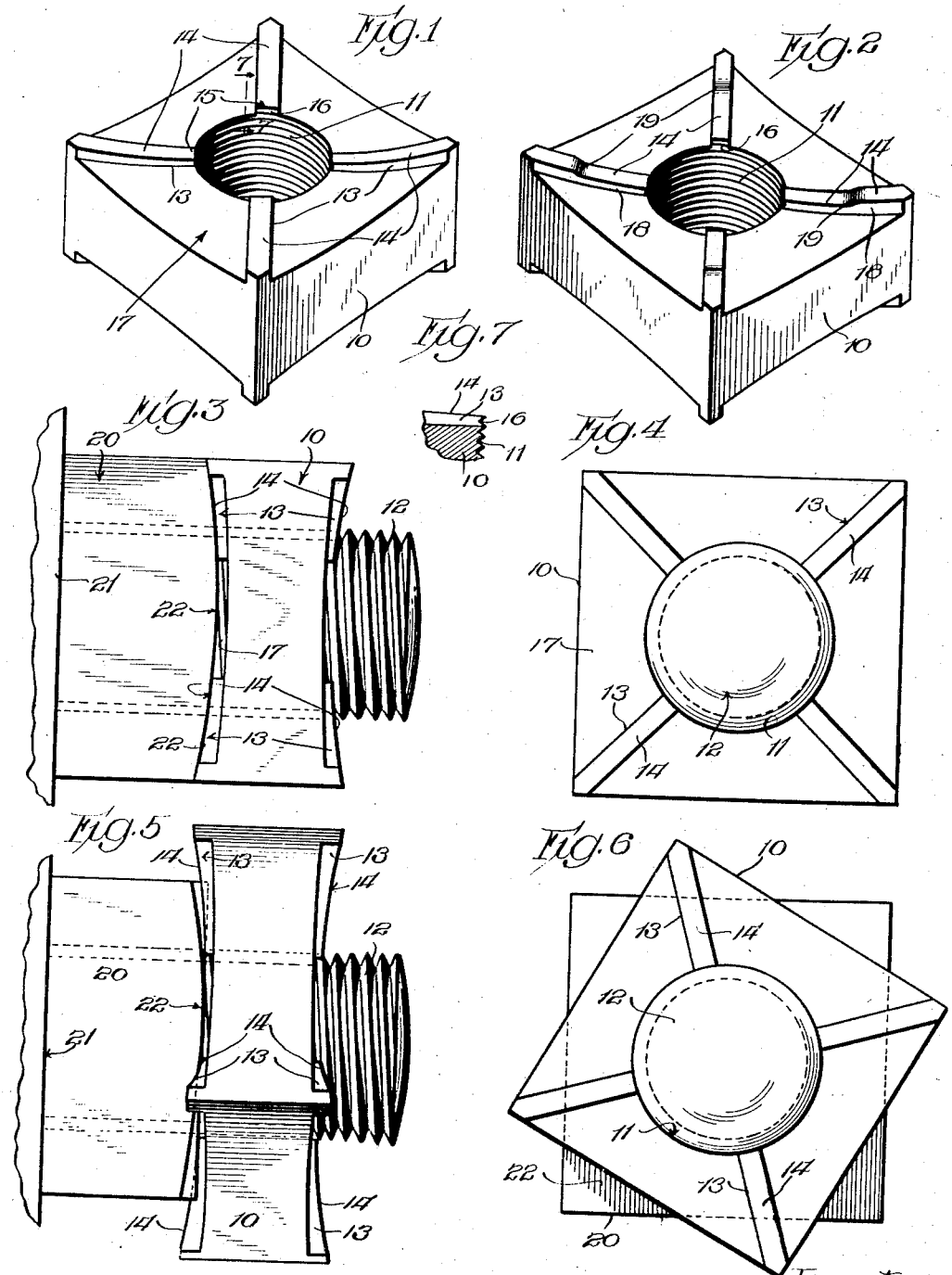

MATTHEW SUHR, OF CHICAGO, ILLINOIS.

LOCK-NUT.

1,329,814.  Specification of Letters Patent.  Patented Feb. 3, 1920.

Application filed October 20, 1919. Serial No. 331,771.

*To all whom it may concern:*

Be it known that I, MATTHEW SUHR, a citizen of the United States, residing at Chicago, in the county of Cook and State of Illinois, have invented certain new and useful Improvements in Lock-Nuts, of which the following is a specification.

This invention relates to improvements in lock nuts and one of the objects of the invention is to provide an improved simple, durable, and inexpensive lock nut adapted for general use and which will coöperate with an ordinary nut to effectively lock the nut so that it cannot jar loose or the bolt cannot be turned out under normal conditions, but which may, by excessive strain or pressure be caused to assume an unlocking position to permit the nut and bolt to be separated or adjusted relatively one with relation to the other.

A further object is to provide an improved lock nut adapted to coöperate with an ordinary nut and having means whereby a relative rotation of the nuts one with relation to the other will cause them to separate in a direction lengthwise of the bolt to cause a gripping or binding action between the threads of the lock nut and the bolt by deflecting the interengaging threads slightly or sufficient to cause such binding action, but which when said relative rotary displacement is effected in the opposite direction will cause the threads to right themselves and the nuts to move together to permit them to be removed from the bolt to be used over again.

To the attainment of these ends and the accomplishment of other new and useful objects as will appear the invention consists in the features of novelty in substantially the construction, combination and arrangement of the several parts hereinafter more fully described and claimed and shown in the accompanying drawing illustrating this invention, and in which:

Figure 1 is a perspective view of a lock nut embodying this invention.

Fig. 2 is a perspective view of a modified form of the lock nut.

Fig. 3 is a side elevation of the lock nut shown in position upon a bolt in conjunction with the ordinary lock, the two being in an unlocked position with respect to each other.

Fig. 4 is a right hand end elevation of the parts shown in Fig. 3.

Fig. 5 is a view similar to Fig. 3 showing the lock nut rotatively displaced with respect to the other nut.

Fig. 6 is a right hand end elevation of the parts shown in Fig. 5.

Fig. 7 is an enlarged detail sectional view on line 7—7, Fig. 1.

Referring more particularly to the drawing the numeral 10 designates the body of the lock nut which may be of any desired size and configuration and is provided with a central threaded opening 11 to receive the bolt 12. The nut is provided with a plurality of radially disposed ribs 13 projecting laterally from the face thereof and these ribs 13 are provided with a concaved surface 14. The ends 15 of the ribs terminate adjacent the opening 11 and are provided on their end faces 16 with threads to form continuations of the threads in the opening 11.

If desired the face 17 of the nut may also be concaved although it is not necessary that they should be so, in order that the nut may effectively operate.

If desired the ribs 14 may be provided on one or both faces of the nut so as to permit the nut to be reversed.

In the form of the invention shown in Fig. 2 the ribs 18 which are similar to the ribs 13 may be provided with a shoulder 19 intermediate its ends for a purpose to be set forth.

In operation the lock nut is adapted to be used in conjunction with an ordinary nut 20 that is threaded upon the bolt 12 so that one face of the nut 20 may abut the work 21. The face 22 of the nut 20 is convexed as shown to form a cam surface and the convexed surface 22 conforms to the curvature of the concaved surface 14 of the ribs 13—18.

The lock nut 10 may be employed in connection with the nut 20 either on the outside thereof so that the nut 20 will be disposed between the work 21 and the lock nut 10 or the locknut 10 may be interposed between the work 21 and the nut 20. In the latter event, however, the nut 20 should be reversed upon the bolt 12 so that the cam face 22 will stand adjacent the lock nut 10.

To assemble the locknut and nut upon the bolt 12, the two nuts are placed together so that their lateral faces will coincide, if the two nuts are of the same diameter, but if not, then the two should be placed together so that the concave faces 14 of the ribs 13 will receive the cam or convex faces 22 of the nut 20. In this position both may be then screwed upon the bolt 12 and when the nut 20 has been seated then the lock nut 10 may be rotatively displaced with relation to the nut 20. This operation will cause the concave surface 14 of the ribs 18—13 to move over the convex surface 22 of the nut 20 and this convex surface will operate as a cam upon the ribs 13—18 and will force the lock nut 10 away from the nut 20 in a direction lengthwise of the bolt 12 so as to cause a binding or gripping action between the threads of the lock nut and bolt. If the nut 20 is arranged outermost on the bolt 12, then this separating movement will tend to force the nut 20 away from the lock nut 10.

When the parts have been thus locked in position and as shown in Figs. 5 and 6 they will remain so locked and the nut 20 will be held against accidental displacement on the bolt caused by vibration. When it is desired to remove the nut 20 the lock nut 10 is rotatively adjusted in the opposite direction with respect to the nut 20 until the parts assume the position shown in Fig. 3, at which time the two may be readily removed from the bolt together and can be used over again.

This locking action, it will be seen, is caused by the cam action of the surface 22 of the nut 20 upon the ribs as they pass over the high portion of the cam.

In the form of the invention shown in Fig. 2, the shoulders 19 may be provided to assist in holding the lock nut in its adjusted and locking position. In that event the shoulder 19 will pass over the edge of the cam surface 22 of the nut 20 and will retain the lock nut in its position under normal conditions. When, however, an abnormal stress or strain is placed upon the lock nut to rotate it in the opposite direction, the shoulder 19 will move out of engagement with the edge 22 of the nut 20 and the parts may be moved into the position shown in Fig. 3.

Obviously any number of ribs 13—18 may be employed and they may be of any desired length to extend either entirely to the respective corners or edges of the lock nut or may terminate short thereof.

While the preferred form of the invention has been herein shown and described, it is to be understood that various changes may be made in the details of construction and in the combination and arrangement of the parts without departing from the spirit of this invention.

What is claimed as new is:—

1. The combination of a bolt, a nut threaded thereon, a nut retaining element also threaded upon the bolt adjacent the nut, and means whereby the relative movement of the nut and nut retaining element, one with relation to the other will cause the two to separate and exert a binding pressure upon the threads of the bolt, the said means embodying a rib arranged transversely of and projecting beyond the face of one of the elements and movable over the adjacent face of the other element in a direction lengthwise of the bolt.

2. The combination of a bolt, a nut threaded thereon, and a nut retaining element also threaded upon the bolt against the nut, one of the adjacent faces of the nut and the said element being shaped to form a cam surface, and a rib arranged transversely of and projecting beyond the adjacent face of the other element, whereby the relative rotative movement of the nut and element will cause the rib and cam to separate the two elements and cause the said element to exert a binding pressure upon the threads of the bolt.

3. The combination of a bolt, a nut threaded thereon, and a nut retaining element also threaded upon the bolt against the nut, one face of the said nut being convexed and the adjacent face of the said element being concaved to receive said face of the nut, and a rib arranged transversely of the said concaved surface and projecting beyond said face, whereby when the two are placed upon the bolt together and one is rotatively displaced with respect to the other the convexed surface will operate as a cam upon the rib on the adjacent surface to force the two elements apart to bind or grip the threads of the bolt in a direction lengthwise of the bolt.

4. The combination of a bolt, a nut threaded thereon, a nut retaining element also threaded upon the bolt against the nut, one face of the nut being convexed, and one or more radial concaved ribs on the adjacent face of the said element whereby when the nut and said retaining element are rotatively displaced one with relation to the other, the said rib or ribs will pass over the said convexed surface and force the nut and element apart to cause a binding or gripping action between the threads of the bolt and the said element transversely of the threads.

5. The combination of a bolt, a nut threaded thereon, a nut retaining element also threaded upon the bolt against the nut, one face of the nut being convexed, and one or more radial concaved ribs on the adjacent face of the said element whereby when the nut and said retaining element are rotatively displaced one with relation to the other, the said rib or ribs will pass over the said convexed surface and force the nut and element apart to cause a binding or gripping action between the threads of the bolt and the said element transversely of the threads, the said rib or ribs being provided with a transverse shoulder intermediate its ends to engage over the edge of the said nut.

6. A lock nut comprising a body portion having a threaded opening therethrough, one of the faces of the nut being concaved, and a rib arranged transversely of and projecting beyond said face.

7. A lock nut comprising a body portion having a threaded opening therethrough, and one or more concaved radially disposed ribs projecting laterally from one face of the nut.

8. A lock nut comprising a body portion having a threaded opening therethrough, and one or more concaved radially disposed ribs projecting laterally from opposite faces thereof whereby said element is reversible.

9. A lock nut comprising a body portion having a threaded opening therethrough, the opposite faces being concaved and one or more radially disposed concaved ribs projecting laterally from each face.

10. A lock nut comprising a body portion having a threaded opening therethrough, one or more concaved radially disposed ribs projecting laterally from one face of the nut, one end of the rib terminating adjacent the said threaded opening and having a portion of a thread in said end to form a continuation of the thread in said opening.

11. A lock nut comprising a body portion having a threaded opening therethrough, and one or more concaved radially disposed ribs projecting laterally from one face of the nut, one end of the rib terminating adjacent the said opening and having a portion of a thread in said end to form a continuation of the thread in the said opening, the face of the rib parallel with the adjacent face of the nut being shaped to form a cam surface.

12. A lock nut comprising a body portion having a threaded opening therethrough, one or more concaved radially disposed ribs projecting laterally from one face of the nut, one end of the rib terminating adjacent the said threaded opening and having a portion of a thread in said end to form a continuation of the thread in said opening, the face of the rib intermediate its ends being provided with a shoulder.

In testimony whereof I have signed my name to this specification on this 17th day of October, A. D. 1919.

MATTHEW SUHR.